Figure 1:
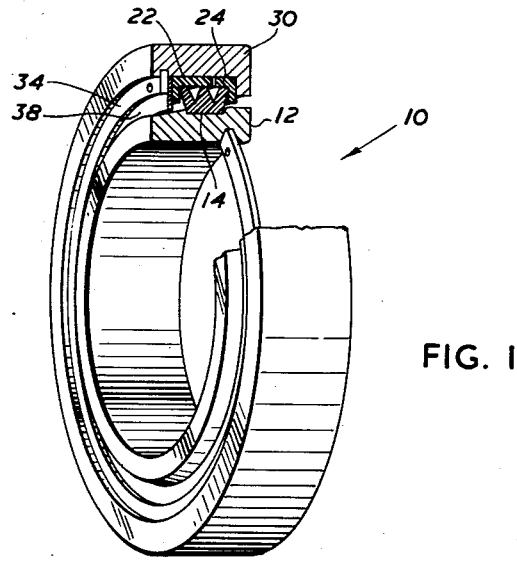

Feb. 20, 1962     H. VOLLMER     3,022,127
SLEEVE BEARING
Filed Jan. 16, 1961

INVENTOR
HERMAN VOLLMER

BY *Featherstonhaugh & Co.*

ATTORNEYS

3,022,127
SLEEVE BEARING
Herman Vollmer, 29 Dufferin St., Stratford,
Ontario, Canada
Filed Jan. 16, 1961, Ser. No. 82,799
10 Claims. (Cl. 308—238)

This invention relates to a sleeve bearing.

It is an object of this invention to provide a sleeve bearing, the bearing elements of which can be machined from a strong tough synthetic plastic material that does not require lubrication such as Teflon or nylon. A great variety of synthetic resinous materials that are waxy in nature and are therefore, self-lubricating have been developed recently and used widely as bearing materials.

It is an object of this invention to provide a self-lubricating sleeve bearing construction that can be mass produced to close tolerances that will operate at a low noise level at high speed.

It is a further object to provide a sleeve bearing that can be readily adjusted as to tolerance.

With these and other objects in view a sleeve bearing according to this invention has an inner bearing mounting ring, an outer bearing mounting ring, an inner bearing sleeve mounted in the inner bearing mounting ring and an outer bearing sleeve mounted in the outer bearing mounting ring so that the two bearing sleeves are in bearing contact with each other. The outer bearing sleeve has flanges at each of its ends that extend radially inwardly to embrace the sides of the inner bearing sleeve. The invention will be clearly understood after reference to the following detailed specification read in conjunction with the drawings.

Figure 2:
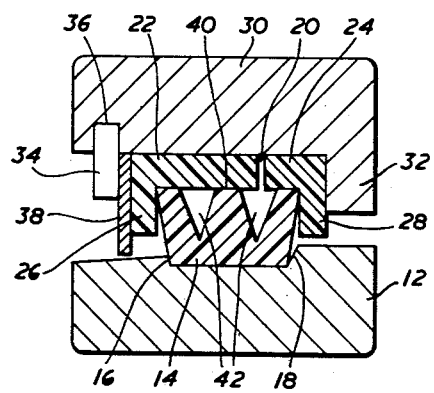

In the drawings,

FIGURE 1 is a perspective view of a bearing construction according to this invention partly broken away and FIGURE 2 is a sectional view of the bearing illustrated in FIGURE 1.

Referring to the drawings, the numeral 10 generally indicates a sleeve bearing construction according to this invention. It comprises an inner steel bearing mounting ring 12 upon which is mounted an inner bearing sleeve 14. Inner bearing sleeve 14 is made from a synthetic resinous material having a waxy characteristic that does not require lubricating when used as a bearing material. Suitable materials are Teflon, which is a trade name of E. I. du Pont De Nemours & Co. Inc. for tetrafluoro ethylene, and nylon. These materials can be deformed when heated but on cooling, reassume their normal shape. Thus, the inner bearing sleeve 14 can be carefully machined and heated sufficiently to permit it to be slipped over the shoulder 16 to enter into the channel on the inner bearing mounting ring 12, where it is securely retained between the shoulder 16 and the shoulder 18.

The outer bearing sleeve of the bearing assembly is formed with a circumferential split as at 20 and comprises the sections 22 and 24, each of which has a flange 26 and 28 respectively at its end that extends radially inwardly and has an inner surface that embraces the side of inner bearing sleeve 14.

The composite outer bearing sleeve is retained in the outer steel bearing ring 30 by means of the radially inwardly extending flange 32 and the resilient retaining ring 34. Ring 34 is split and is flexed to permit it to enter into a circumferentially extending groove 36 where it reasserts itself and is firmly retained. The numeral 38 refers to a spacer ring that can be inserted between the section 22 of the outer bearing ring and the retaining ring 34 for the purpose of exerting pressure on the cut-away sides of the inner bearing sleeve 14 whereby to force the cylindrical bearing surface thereof against the cylindrical bearing surface of the outer bearing sleeve.

By varying the thickness of the spacer 38 one can vary the clearance as at 40 between the cylindrical bearing surfaces of the two bearing sleeves. In some applications, the spacer bar 38 may not be required. It is a matter of the tolerance that is permitted at 40 and the accuracy with which the various component parts of the bearing assembly are made.

It will be noted that the side walls of the inner bearing sleeve 14 are cut-away but that there is bearing engagement between the side walls of the bearing sleeve and the flanges 26 and 28 of the outer bearing sleeve.

The inner bearing sleeve 14 is formed with circumferentially extending grooves 42 in its cylindrical bearing surface. These grooves permit a certain amount of lateral adjustment in the width of the bearing surface as it is forcefully embraced by the flanges of the outer bearing ring to vary the spacing as at 40 mentioned above. The grooves also tend to accumulate any dirt that might get into the bearing.

The bearing can also be manufactured by the well-known plastic sleeve bearing moulding techniques. In such a case, the outer bearing sleeve would not have a split in it. One would, for example, take a known powdered moulding mixture comprised of say 50% powdered Teflon, 45% powdered bronze, predominantly copper, and a liquid binder with say a small amount of powdered steel in it. These ingredients would be mixed to make a moulding paste and an inner bearing sleeve similar to the sleeve 14 would be moulded in a mould directly on to an inner bearing moulding ring similar to the moulding ring 12. Following oven curing to the moulded article, it would be removed from the mould and the grooves could then be cut if desired. The cured moulding sleeve and ring would then be immersed in a heavy oil and placed in an appropriate mould and the outer bearing sleeve is similarly moulded around the inner bearing sleeve and cured according to standard practice. The outer ring would be similar to the ring 22 and would have flanges similar to flanges 26 and 28. The unit would then be inserted into an outer bearing mounting ring.

It is well-known to manufacture sleeve bearings by this technique and further detail is not thought necessary in this specification.

From the above, it will be appreciated that the bearing assembly is exceedingly simple in construction and this in combination with its advantages in operation such as quietness of operation and suitability for end thrust combine to make it an exceedingly practical low cost bearing. Embodiments of the invention other than the ones discussed will be apparent to those skilled in the art and it is not my intention that the foregoing description should be read in the limiting sense.

What I claim as my invention is:

1. A sleeve bearing comprising an inner bearing mounting ring, an outer bearing mounting ring, an inner bearing sleeve, means for mounting said inner bearing sleeve in said inner mounting ring, an outer bearing sleeve, means for mounting said outer bearing sleeve in said outer bearing mounting ring with the inner cylindrical bearing surface thereof in bearing contact with the outer cylindrical bearing surface of said inner bearing sleeve, said outer bearing sleeve being circumferentially split and having flanges at each of its ends that extend radially inwardly and that have inner surfaces that embrace said inner bearing sleeve.

2. A sleeve bearing as claimed in claim 1 in which said outer bearing sleeve is circumferentially split as aforesaid, the edges of said sleeve at the said split being slightly spaced apart.

3. A sleeve bearing as claimed in claim 1 or claim 2 in which said inner bearing sleeve is formed with circumferential extending grooves.

4. A sleeve bearing as claimed in claim 1 in which said means for mounting said outer bearing sleeve in said outer mounting ring comprises a circumferentially extending flange at one end of said outer mounting ring and a resilient means adapted to engage with said outer bearing ring to cooperate with said flange to retain said sleeve.

5. A sleeve bearing as claimed in claim 4 in which said resilient means is a split ring.

6. A sleeve bearing as claimed in claim 1 in which the side surfaces of said inner bearing sleeve are cut away from said flanges on said outer bearing sleeve.

7. A sleeve bearing comprising an inner bearing mounting ring, an outer bearing mounting ring, an inner bearing sleeve, means for mounting said inner bearing sleeve in said inner mounting ring, an outer bearing sleeve, means for mounting said outer bearing sleeve in said outer bearing mounting ring with the inner cylindrical bearing surface thereof in bearing contact with the outer cylindrical bearing surface of said inner bearing sleeve, said outer bearing sleeve having flanges at each of its ends that extend radially inwardly and that have inner surfaces that embrace said inner bearing sleeve.

8. A sleeve bearing as claimed in claim 7 in which said inner bearing sleeve is formed with circumferential extending grooves.

9. A sleeve bearing as claimed in claim 7 in which the side surfaces of said inner bearing sleeve are cut away from said flanges on said outer bearing sleeve.

10. A sleeve bearing as claimed in claim 8 in which the side surfaces of said inner bearing sleeve are cut away from said flanges on said outer bearing sleeve.

References Cited in the file of this patent

UNITED STATES PATENTS

| 2,702,730 | Ivanoff et al. | Feb. 22, 1955 |

FOREIGN PATENTS

| 567,905 | Great Britain | Mar. 7, 1945 |
| 538,584 | Italy | Jan. 26, 1956 |
| 1,228,232 | France | Mar. 14, 1960 |